(12) United States Patent
Hu et al.

(10) Patent No.: US 7,365,862 B2
(45) Date of Patent: Apr. 29, 2008

(54) METHODS AND APPARATUS FOR INSPECTING AN OBJECT

(75) Inventors: Qingying Hu, Clifton Park, NY (US); Kevin George Harding, Nishkayuna, NY (US); Joseph Benjamin Ross, Cincinnati, OH (US); Donald Wagner Hamilton, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 171 days.

(21) Appl. No.: 11/257,180

(22) Filed: Oct. 24, 2005

(65) Prior Publication Data

US 2007/0091321 A1    Apr. 26, 2007

(51) Int. Cl.
G01B 11/00    (2006.01)

(52) U.S. Cl. ............ 356/601; 356/391; 356/390; 356/395; 356/394; 250/559.22; 382/174; 702/34; 702/127; 702/159; 702/166; 702/170; 355/69

(58) Field of Classification Search ........... 356/394, 356/391, 390, 395, 601, 612, 237.2, 237.6; 250/559.39, 559.22; 700/129, 67
See application file for complete search history.

(56) References Cited

U.S. PATENT DOCUMENTS

| | | | |
|---|---|---|---|
| 4,585,947 A | 4/1986 | Liptay-Wagner et al. | |
| 4,686,374 A | 8/1987 | Liptay-Wagner et al. | |
| 5,307,151 A | 4/1994 | Hof et al. | |
| 5,998,069 A * | 12/1999 | Cutter et al. ................ | 430/5 |
| 6,028,671 A | 2/2000 | Svetkoff et al. | |
| 6,064,759 A | 5/2000 | Buckley et al. | |
| 6,544,698 B1 * | 4/2003 | Fries ........................ | 430/22 |
| 6,639,685 B1 | 10/2003 | Gu et al. | |
| 6,678,057 B2 | 1/2004 | Harding et al. | |
| 7,102,733 B2 * | 9/2006 | Latypov et al. ............ | 355/67 |
| 2002/0014577 A1 | 2/2002 | Ulrich et al. | |
| 2002/0076104 A1 * | 6/2002 | Sun ........................ | 382/173 |
| 2005/0111726 A1 | 5/2005 | Hackney et al. | |
| 2006/0130679 A1 * | 6/2006 | DuBois, III ............ | 101/128.4 |
| 2006/0268254 A1 * | 11/2006 | Percin et al. ............ | 355/69 |

OTHER PUBLICATIONS

Hu, Qingying, et al., Shiny Parts Measurement Using Color Separation, 8 page abstract, GE GRC, Schenectady, NY (Oct. 22, 2005).

* cited by examiner

*Primary Examiner*—Gregory J. Toatley, Jr.
*Assistant Examiner*—Rebecca C Slomski
(74) *Attorney, Agent, or Firm*—William Scott Andes; Armstrong Teasdale LLP

(57) ABSTRACT

A method for generating a mask for use with a light measurement system that includes a light source for projecting light onto an object, and an imaging sensor for receiving light reflected from the object. The method includes determining a profile of the object to be inspected, and generating an electronic mask based on the determined object profile. The electronic mask has an electronic opening having a profile defined to substantially match the determined object profile as viewed from one of the light source and the imaging sensor.

20 Claims, 5 Drawing Sheets

METHODS AND APPARATUS FOR INSPECTING AN OBJECT

BACKGROUND OF THE INVENTION

This application relates generally to inspecting objects, and more specifically to methods and apparatus for inspecting objects using a light measurement system.

Objects are sometimes inspected, for example, to determine a size and/or shape of all or a portion of the object and/or to detect defects in the object. For example, some gas turbine engine components, such as turbine or compressor blades, are inspected to detect fatigue cracks that may be caused by vibratory, mechanical, and/or thermal stresses induced to the engine. Moreover, and for example, some gas turbine engine blades are inspected for deformations such as platform orientation, contour cross-section, bow and twist along a stacking axis, thickness, and/or chord length at given cross-sections. Over time, continued operation of the object with one or more defects may reduce performance of the object and/or lead to object failures, for example, as cracks propagate through the object. Accordingly, detecting defects of the object as early as possible may facilitate increasing the performance of the object and/or reducing object failures.

To facilitate inspecting objects, at least some objects are inspected using a light measurement system that projects a structured light pattern onto a surface of the object. The light measurement system images the structured light pattern reflected from the surface of the object and then analyzes the deformation of the reflected light pattern to calculate the surface features of the object. More specifically, during operation, the object to be inspected is typically coupled to a test fixture and is then positioned proximate to the light measurement system. A light source is then activated such that emitted light illuminates the object to be inspected. However, because the light source also illuminates at least a portion of the test fixture, and/or portions of the object outside an area to be inspected, a resultant image of the object may include noise caused by inter-reflections between the object and portions of the test fixture illuminated by the light source, and/or between an area of the object to be inspected and portions of the object outside the area to be inspected. For example, such inter-reflections may be caused if the test fixture has a shape or finish that casts reflections on the object, and/or if the object has a relatively mirror-like finish that reflects an image of the test fixture. Moreover, ambient light may also cause noise in the resultant image. Noise caused by such inter-reflections and/or ambient light may result in reduced image quality and poor measurement results, possibly leading to an incorrect interpretation of surface features of the object.

Accordingly, at least some known light measurement systems include a physical mask that is formed, for example, from a sheet of paper or metal. The physical mask limits an area illuminated by the light source to facilitate reducing inter-reflections between the test fixture and the object. However, because such physical masks are uniquely formed for the geometry and/or orientation of a particular object, such masks generally are not interchangeable and need to be changed when the object is re-orientated or when a different object is inspected. Moreover, fabrication of such physical masks may be time-consuming.

BRIEF DESCRIPTION OF THE INVENTION

In one aspect, a method is provided for generating a mask for use with a light measurement system that includes a light source for projecting light onto an object, and an imaging sensor for receiving light reflected from the object. The method includes determining a profile of the object to be inspected, and generating an electronic mask based on the determined object profile. The electronic mask has an electronic opening having a profile defined to substantially match the determined object profile as viewed from one of the light source and the imaging sensor.

In another aspect, a method is provided for inspecting an object using a light measurement system that includes a light source and an imaging sensor. The method includes generating an electronic mask that includes an electronic opening having a profile that substantially matches a profile of the object to be inspected as viewed from one of the light source and the imaging sensor, and channeling light through the electronic mask opening such that light is dispersed therefrom in a pattern that substantially matches the object profile.

In another aspect, a structured light measurement system for inspecting an object includes a structured light source configured to project structured light onto a surface of the object, an imaging sensor configured to receive structured light reflected from the object surface, and an electronic mask operable with one of the structured light source and the imaging sensor. The electronic mask includes an electronic opening having a profile defined to substantially match a profile of the object to be inspected as viewed from one of the light source and the imaging sensor.

DETAILED DESCRIPTION OF THE INVENTION

Figure 1:
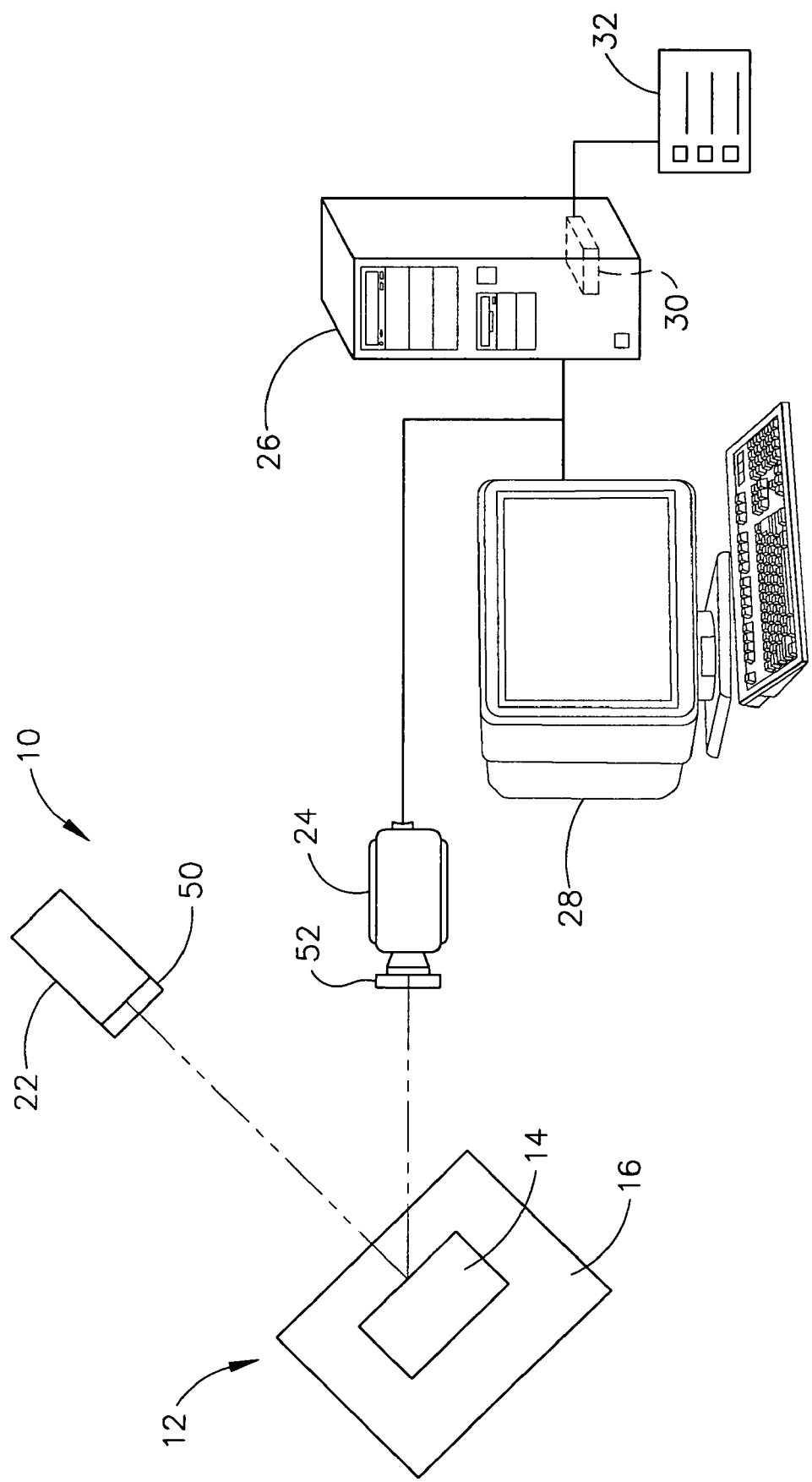
FIG. 1 is a block diagram of an exemplary embodiment of a structured light measurement system.
Figure 2:
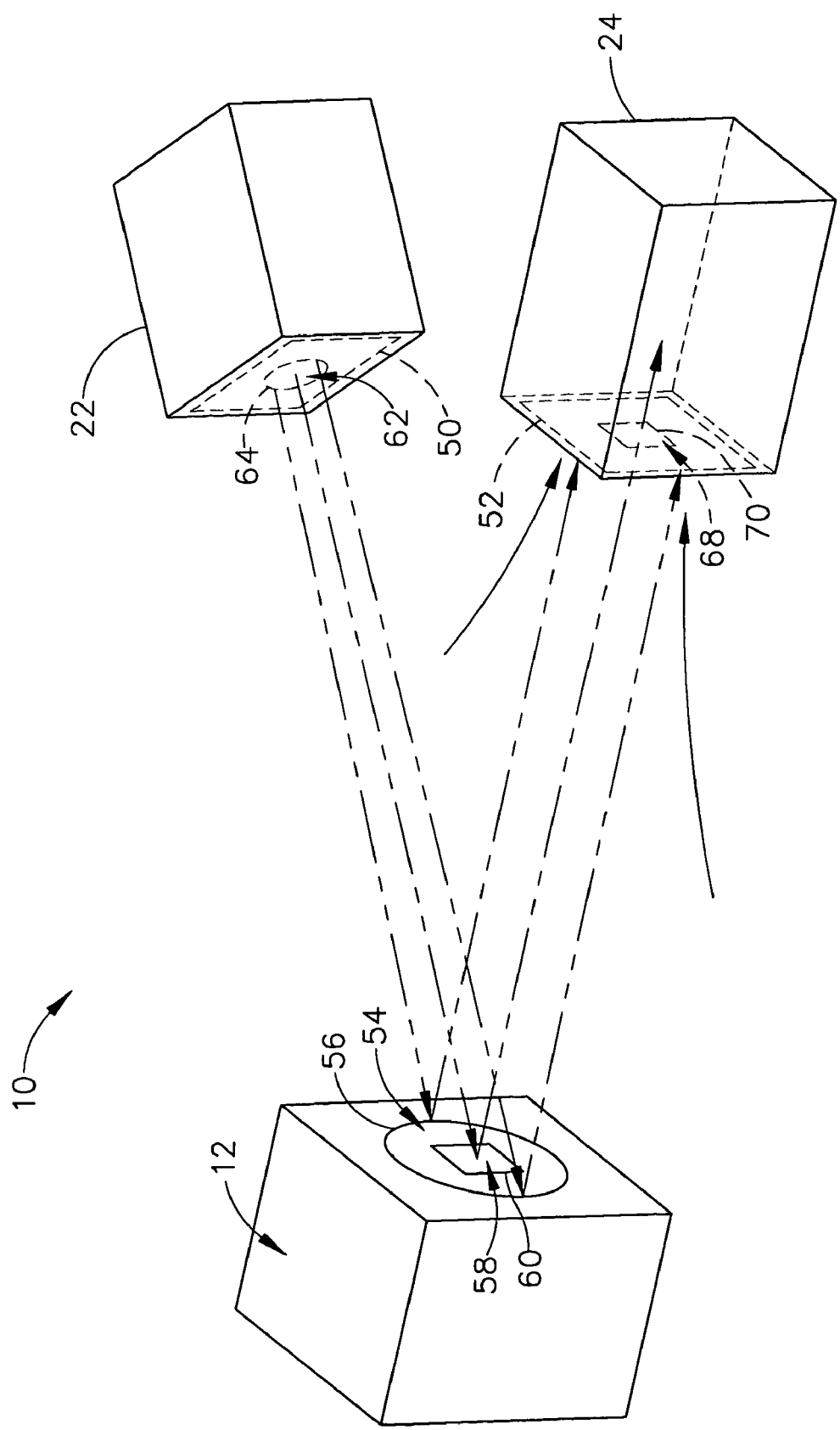
FIG. 2 is a perspective view of a portion of the structured light measurement system shown in FIG. 1.

FIG. 1 is a block diagram of an exemplary embodiment of a structured light measurement system 10 that is used to measure a plurality of surface features of an object 12. FIG. 2 is a perspective view of a portion of system 10. For example, system 10 may be used to inspect and determine surfaces of object 12, wherein the surfaces may include features such as tilts, bends, twists, and/or warps when compared to a model representative of object 12.

In the exemplary embodiment, object 12 is a rotor blade, such as, but not limited to, a compressor or turbine blade utilized in a turbine engine. Accordingly, and in the exemplary embodiment, object 12 includes an airfoil 14 extending outwardly from a platform 16. While the following description is directed to inspecting gas turbine engine blades, one skilled in the art will appreciate that inspection system 10 may be utilized to improve structured light imaging for any object.

System 10 includes a structured light source 22, such as, but not limited to, a laser, a white light lamp, a light emitting diode (LED), a liquid crystal display (LCD) device, a liquid crystal on silicon (LCOS) device, and/or a digital micromirror device (DMD). System 10 also includes one or more imaging sensors 24 that receive structured light reflected from object 12. In the exemplary embodiment, imaging sensor 24 is a camera that receives and creates images using structured light reflected from object 12, although system 10 may utilize other imaging sensors 24. One or more computers 26 process images received from sensors 24, and a monitor 28 may be utilized to display information to an operator. In one embodiment, computer(s) 26 include a device 30, for example, a floppy disk drive, CD-ROM drive, DVD drive, magnetic optical disk (MOD) device, and/or any other digital device including a network connecting device such as an Ethernet device for reading instructions and/or data from a computer-readable medium 32, such as a floppy disk, a CD-ROM, a DVD, and/or another digital source such as a network or the Internet, as well as yet to be developed digital means. In another embodiment, computer(s) 26 execute instructions stored in firmware (not shown). Computer(s) 26 are programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

During operation, an object to be inspected, for example object 12, is coupled to a test fixture (not shown) and positioned proximate to system 10. Light source 22 is then activated causing emitted light to illuminate object 12. Imaging sensors 24 obtain an image of the emitted light pattern projected onto object 12. However, because light source 22 also illuminates at least a portion of the test fixture, a resultant image of object 12 may include noise caused by inter-reflections between object 12 and portions of the test fixture illuminated by light source 22. For example, such inter-reflections may be caused if the test fixture has a shape or finish that casts reflections on object 12, and/or if object 12 has a relatively mirror-like finish that reflects an image of the test fixture. Moreover, ambient light may also cause noise in the resultant image. Noise caused by such inter-reflections and/or ambient light may result in reduced image quality and poor measurement results, possibly leading to an incorrect interpretation of surface features of object 12.

In the exemplary embodiment, system 10 includes an electronic fringe mask 50 that is operable with light source 22 to illuminate object 12, and an electronic image mask 52 that is operable with imaging sensor 24 to receive light reflected from object 12. Fringe mask 50 facilitates precluding light source 22 from illuminating portions of object 12 other than a desired portion 54 of object 12 to be inspected. As such, fringe mask 50 facilitates reducing inter-reflections between surrounding structure, such as, but not limited to, the test fixture, a floor, a ceiling, a wall, and/or the ground, and surfaces of object 12 to be inspected. More specifically, fringe mask 50 facilitates producing an illumination pattern on object 12 that substantially matches a profile 56 of the desired portion 54 of object 12 to be inspected, as viewed from light source 22.

Image mask 52 facilitates blocking ambient light and/or light reflected from structures adjacent to object 12 from being received by imaging sensor 24. In the exemplary embodiment, image mask 52 also facilitates blocking light reflected from surfaces outside a selected portion 58 of object portion 54 from being received by imaging sensor 24. More specifically, in the exemplary embodiment, image mask 52 facilitates light reflected from object 12 being received by imaging sensor 24 in a pattern that substantially matches a profile 60 of object portion 58, as viewed from imaging sensor 24. However, in some embodiments, image mask 52 facilitates light reflected from object 12 being received in imaging sensor 24 in a pattern that substantially matches profile 56 of object portion 54, as viewed from imaging sensor 24.

To facilitate producing an illumination pattern on object 12 that substantially matches the profile 56 of object portion 54, fringe mask 50 includes an electronic opening 62 defined with a profile 64 to substantially match the profile 56 of object portion 54. Fringe mask 50 is operable with light source 22 such that light emitted from light source 22 is "channeled" through fringe mask 50, and more specifically fringe mask electronic opening 62. Light "channeled" through fringe mask electronic opening 62 is dispersed in a pattern that substantially matches profile 56 of object portion 54, such that light emitted from light source 22 illuminates the object profile 56. Moreover, as light is "channeled" through opening 62, other portions of fringe mask 50 facilitate precluding light source 22 from illuminating surfaces of object 12 outside profile 54, and thereby facilitate reducing inter-reflections. Accordingly, fringe mask 50 facilitates electronically controlling light emitted from light source 22 to produce an illumination pattern that substantially matches object profile 56.

Although fringe mask 50 may have other forms, in some embodiments, fringe mask 50 is a computer program that facilitates controlling a pattern light emitted from light source 22. For example, in some embodiments, fringe mask 50 is a computer program that controls an output of a plurality of pixels of light. In the exemplary embodiment, fringe mask 50 is stored on, and executed by, a computer (not shown) associated with light source 22. However, fringe mask 50 may be stored on and executed by computer(s) 26, when operatively connected to light source 22, and/or other computers (not shown), such as, but not limited to, computers remote from light source 22 and/or system 10.

To facilitate light reflected from object 12 being received in imaging sensor 24 in a pattern that substantially matches profile 60 of object portion 58, image mask 52 includes an electronic opening 68 having a profile 70 defined to substantially match profile 60 of object portion 58. Image mask 52 is operable with imaging sensor 24 such that light reflected from object 12 is "channeled" through image mask 52, and more specifically image mask electronic opening 68. Light "channeled" through opening 68 is dispersed in a pattern that substantially matches object profile 60. As light is "channeled" through image mask electronic opening 68, image mask 52 facilitates blocking ambient light, light reflected from surfaces outside object portion 58, and/or light reflected from structures adjacent to object 12 from being received by imaging sensor 24. Accordingly, image mask 52 facilitates electronically controlling light received by imaging sensor 24.

Although image mask 52 may have other forms, in some embodiments, image mask 52 is a computer program that facilitates controlling a pattern of light received by imaging sensor 24. For example, in some embodiments, image mask 52 is a computer program that controls a plurality of pixels of imaging sensor 24. In the exemplary embodiment, image mask 50 is stored on and executed by a computer (not shown) associated with imaging sensor 24. However, image mask 52 may be stored on and executed by computer(s) 26 and/or other computers (not shown), such as, but not limited to, computers remote from imaging sensor 24 and/or system 10.

As discussed above, in the exemplary embodiment, fringe mask 50 illuminates the portion 54 of object 12, and image mask enables a selected portion 58 of object portion 54 to be inspected. Accordingly, object portion 60 is generally smaller than, and at least partially contained within, object portion 54. By selecting and inspecting only a portion of object portion 54, such as, but not limited to, object portion 58, an amount of data collected can be reduced such that processing of inspection data can be expedited. Alternatively, image mask electronic opening profile 70 may be defined to substantially match object profile 56 such that a pattern of light received by imaging sensor 24 substantially matches object profile 56. As such, in some embodiments, image mask 52 may be used to inspect all of object portion 54, or a greater portion of object portion 54 than object portion 60.

Figure 3:
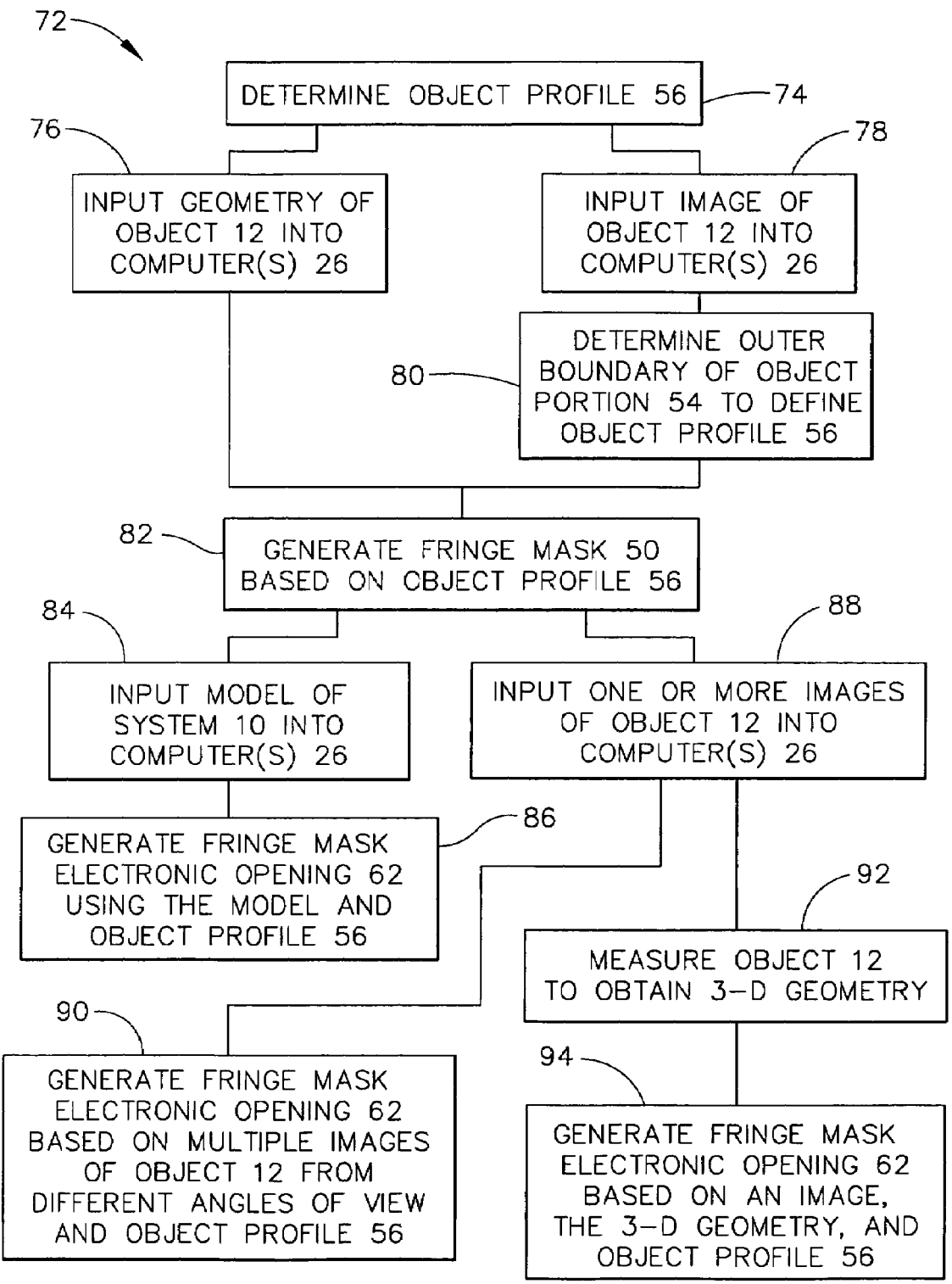
FIG. 3 is a flow chart illustrating an exemplary method of generating an electronic fringe mask for use with the structured light measurement system shown in FIGS. 1 and 2.

FIG. 3 is a flow chart illustrating an exemplary method 72 of generating fringe mask 50. Method 72 includes determining 74 a profile 56 of object portion 54. In some embodiments, to determine 74 an object profile 56, a file including a geometry of object 12 is input 76 into computer(s) 26 using, for example, device 30. As used herein, the geometry of object 12 is defined as three-dimensional data relevant to object 12. For example, to fabricate object 12, a computer-aided design (CAD) drawing of object 12 is generated utilizing a computer program. Once the geometry of object 12 is input 76 into computer(s) 26, an object profile 56 can then be determined 74 therefrom.

In other embodiments, to determine 74 the object profile 56, a file including an image of object 12 is input 78 into computer(s) 26 using, for example, device 30. An outer boundary of object portion 54 is then determined 80 on the image to define an object profile 56. Although the outer boundary of object portion 54 may be determined 80 in other ways, in some embodiments the outer boundary of object portion 54 is manually selected by an operator using computer(s) 26, for example, using a mouse (not shown) and/or other interactive device (not shown). Moreover, and although the outer boundary of object portion 54 may be determined 80 in other ways, in some embodiments the outer boundary of object portion 54 detected using known edge detection methods.

Once an object profile 56 has been determined 74, fringe mask 50 is generated 82 based on profile 56. In some embodiments, to generate 82 fringe mask 50, a file including a model of system 10 is input 84 into computer(s) 26 using, for example, device 30. Fringe mask 50, and more specifically fringe mask opening 62, can then be generated 86 using the model of system 10 and the determined object profile 56. In other embodiments, to generate 82 fringe mask 50, a file including one or more images of object 12 is input 88 into computer(s) 26. If the file contains multiple images of object 12 taken from different angles of view, fringe mask 50, and more specifically fringe mask electronic opening 62, can be generated 90 based on the multiple images and determined object profile 56, using, for example, conventional boundary selection criteria. If the file contains a single image of object 12, object 12 may be measured 92 to obtain three-dimensional geometry of object 12. Fringe mask 50, and more specifically fringe mask electronic opening 62, can then be generated 94 using determined object profile 56, the image, and the measured three-dimensional geometry of object 12 to back-project the object profile 56 to light source 22.

Although method 72 is described with respect to computer(s) 26, it should be understood that any computer can be utilized to perform portions of method 72 for generating mask 50.

Figure 4:
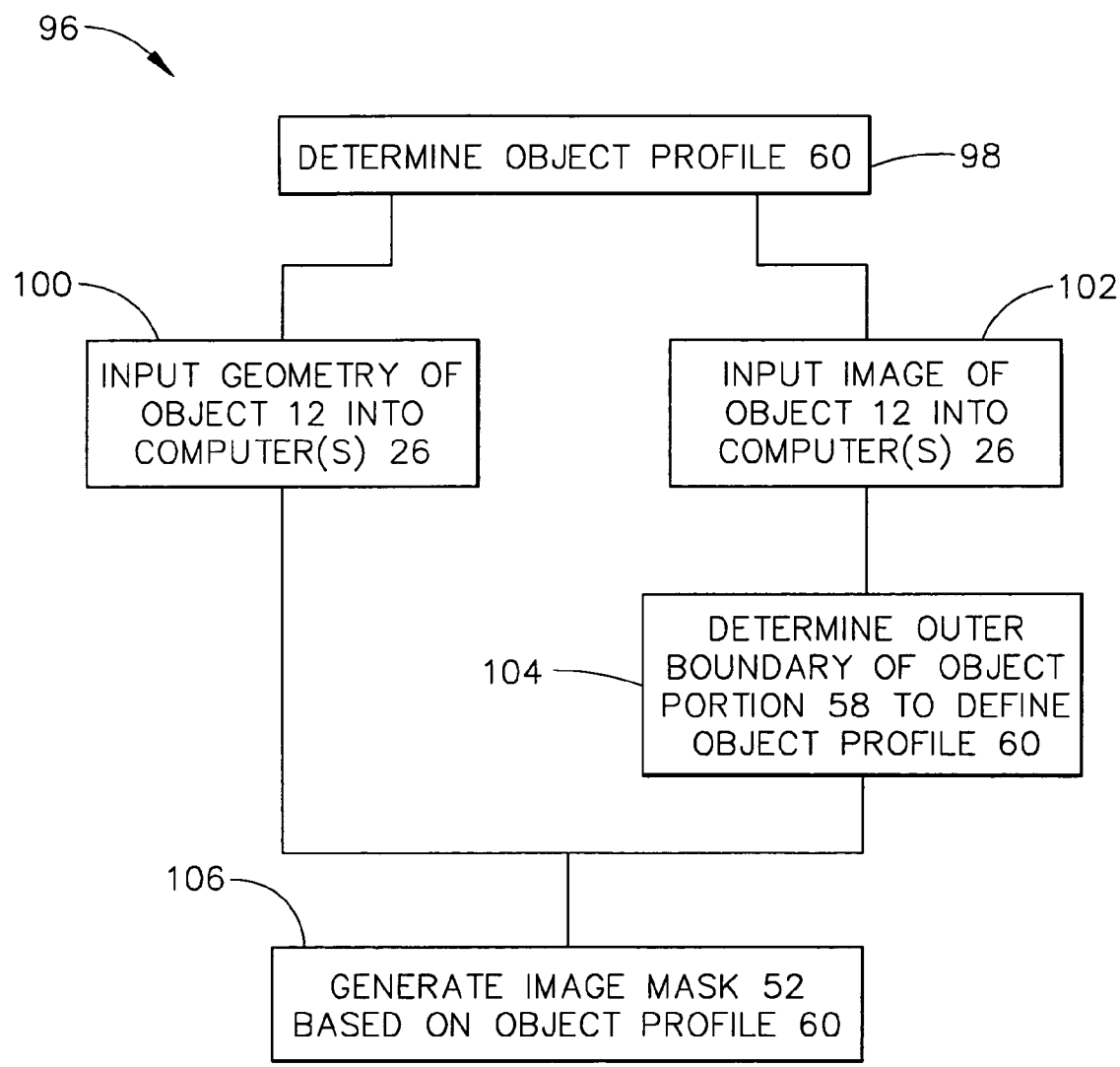
FIG. 4 is a flow chart illustrating an exemplary method of generating an electronic image mask for use with the structured light measurement system shown in FIGS. 1 and 2.

FIG. 4 is a flow chart illustrating an exemplary method 96 of generating image mask 52. Method 96 includes determining 98 a profile 60 of object portion 58. In some embodiments, to determine 98 an object profile 60, a file including a geometry of object 12 is input 100 into computer(s) 26 using, for example, device 30. Once the geometry of object 12 is input 100 into computer(s) 26, an object profile 60 can then be determined 98 therefrom.

In other embodiments, to determine 98 the object profile 60, a file including an image of object 12 is input 102 into computer(s) 26 using, for example, device 30. An outer boundary of object portion 58 is then determined 104 on the image to define an object profile 60. Although the outer boundary of object portion 58 may be determined 104 in other ways, in some embodiments the outer boundary of object portion 58 is manually selected by an operator using computer(s) 26, for example, using a mouse (not shown) and/or other interactive device (not shown). Moreover, and although the outer boundary of object portion 58 may be determined 104 in other ways, in some embodiments the outer boundary of object portion 58 detected using known edge detection methods. Once an object profile 60 has been determined 90, image mask 52, and more specifically image mask electronic opening 68, is generated 106 based on profile 60. Alternatively, image mask 52 is generated 106 based on object profile 56.

Although method 96 is described with respect to computer(s) 26, it should be understood that any computer can be utilized to perform portions of method 96 for generating mask 52.

Figure 5:
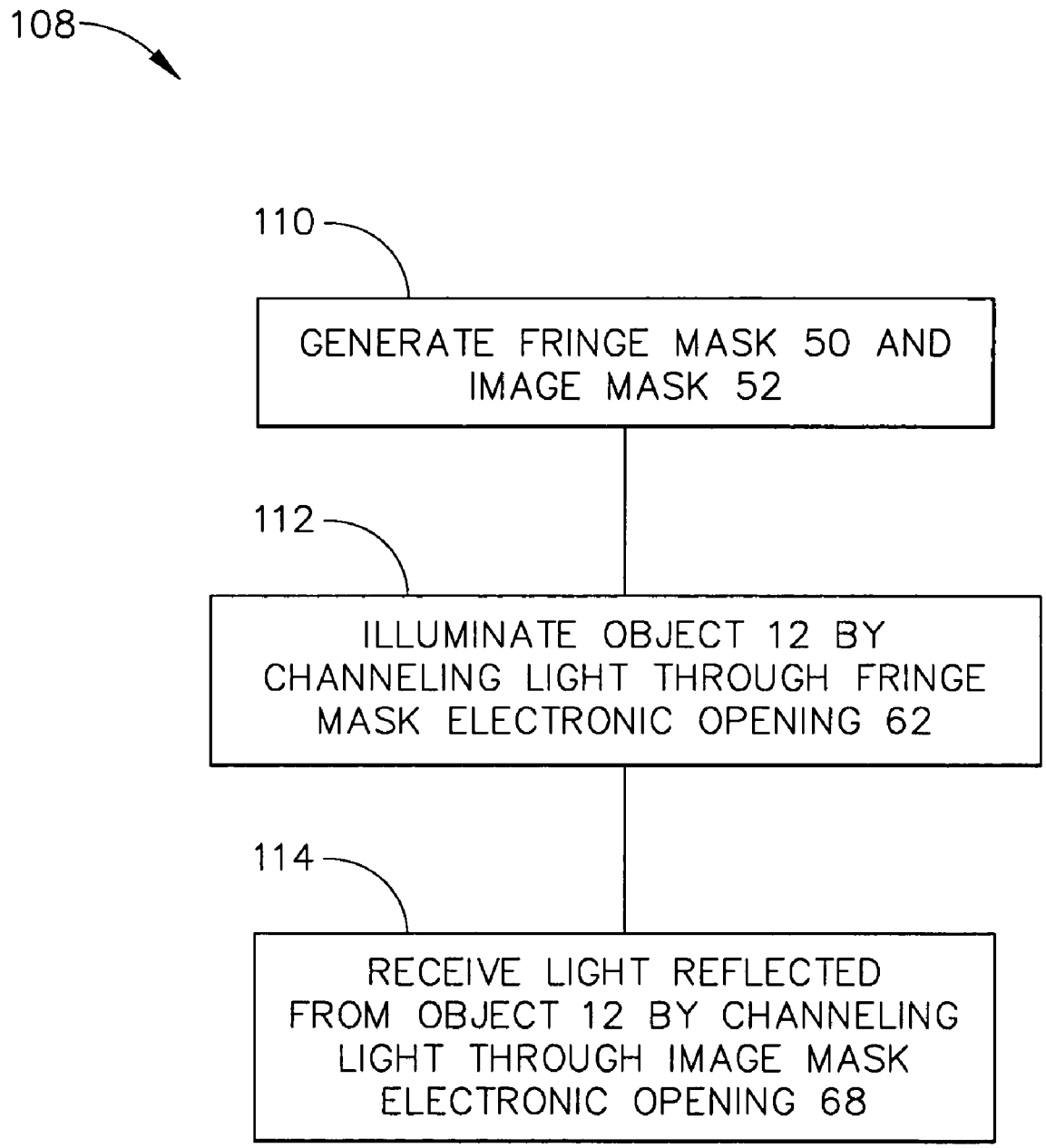
FIG. 5 is a flow chart illustrating an exemplary method for inspecting an object using the structured light measurement system shown in FIGS. 1 and 2.

FIG. 5 is a flow chart illustrating an exemplary method 108 for inspecting object 12 using system 10 (shown in FIGS. 1 and 2). Method 108 includes generating 110 a fringe mask 50 and an image mask 52, for example, as described above. Method 108 also includes illuminating 112 object 12 by channeling light emitted from light source 22 through fringe mask electronic opening 62 such that light is dispersed in a pattern that substantially matches object profile 56, as viewed from light source 22. Method 108 also includes receiving 114 light reflected from object 12 by channeling light reflected from object 12 through image mask electronic opening 68 such that light is dispersed in a pattern that substantially matches object profile 60, as viewed from imaging sensor 24. Alternatively, method 96 includes receiving light reflected from object 12 by channeling light reflected from object 12 through image mask electronic opening 68 such that light is dispersed in a pattern that substantially matches object profile 56, as viewed from imaging sensor 24.

Although method 108 is described with respect to computer(s) 26, it should be understood that any computer can be utilized to perform portions of method 108 for inspecting object 12.

The above described fringe and image masks 50 and 52, respectively, facilitate improving inspection image quality and increasing an efficiency of inspection. More specifically, by producing an illumination pattern on object 12 that substantially matches a profile of a portion of object 12 to be inspected, fringe mask 50 facilitates precluding light source 22 from illuminating portions of object 12 other than the portion of object 12 to be inspected. Fringe mask 50 thereby facilitates reducing inter-reflections between surrounding structure and the surfaces of object 12 to be inspected.

Similarly, by receiving light reflected from object 12 into imaging sensor 24 in a pattern that substantially matches a profile of a portion of object 12 to be inspected, image mask 52 facilitates blocking ambient light, light reflected from surfaces outside the portion of object 12 to be inspected, and/or light reflected from structures adjacent to object 12 from being received by imaging sensor 24. Accordingly, imaging sensor 24 receives higher quality data, which may facilitate reducing image processing time. Moreover, by using image mask 52 to view, and therefore inspect, only a portion of the object portion illuminated by fringe mask 50, an amount of data collected can be reduced thereby possibly reducing image processing time. Moreover, because fringe mask 50 and image mask 52 are electronic masks, masks 50 and 52 may facilitate reducing an inspection time because they may be more easily formed than physical masks, and/or may be more easily adapted for different objects and/or different object profiles. A technical effect of the methods and systems described and/or illustrated herein includes facilitating improving inspection image quality and increasing an efficiency of inspection by producing an illumination pattern on object 12 that substantially matches a profile of a portion of object 12 to be inspected, and by receiving light reflected from object 12 into imaging sensor 24 in a pattern that substantially matches a profile of a portion of object 12 to be inspected.

Although the systems and methods described and/or illustrated herein are described and/or illustrated with respect to gas turbine engine components, and more specifically an engine blade for a gas turbine engine, practice of the systems and methods described and/or illustrated herein is not limited to gas turbine engine blades, nor gas turbine engine components generally. Rather, the systems and methods described and/or illustrated herein are applicable to any object.

Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the assemblies and methods described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for generating a mask for use with a light measurement system that includes a light source for projecting light onto an object, and an imaging sensor for receiving light reflected from the object, said method comprising:
   determining a profile of the object to be inspected; and
   generating an electronic mask based on the determined object profile, wherein the electronic mask has an electronic opening having a profile defined to substantially match the determined object profile as viewed from one of the light source and the imaging sensor.

2. A method in accordance with claim 1 wherein:
   determining a profile of the object to be inspected comprises determining the object profile based on a geometry of the object; and
   generating an electronic mask comprises generating the electronic opening profile of the mask based on at least one of the determined object profile and a light measurement system model inputted into the computer.

3. A method in accordance with claim 1 wherein determining a profile of the object to be inspected comprises creating an image of the object, and determining, on the image, an outer boundary of a portion of the object to be inspected.

4. A method in accordance with claim 3 wherein generating an electronic mask further comprises measuring the object to obtain three-dimensional data of the object.

5. A method in accordance with claim 3 wherein determining, on the image, an outer boundary comprises at least one of manually selecting the outer boundary and detecting the outer boundary using edge detection methods.

6. A method in accordance with claim 1 wherein generating an electronic mask comprises creating multiple images of the object from different angles of view.

7. A method for inspecting an object using a light measurement system that includes a light source and an imaging sensor, said method comprising:
   generating an electronic mask that includes an electronic opening having a profile that substantially matches a profile of the object to be inspected as viewed from one of the light source and the imaging sensor; and
   channeling light through the electronic mask opening such that light is dispersed therefrom in a pattern that substantially matches the object profile.

8. A method in accordance with claim 7 wherein channeling light through the electronic mask opening comprises illuminating at least a portion of the object.

9. A method in accordance with claim 7 wherein channeling light through the electronic mask opening comprises receiving light reflected from the object into the imaging sensor.

10. A method in accordance with claim 7 wherein channeling light through the electronic mask opening comprises blocking light from illuminating at least one of a portion of the object outside the object profile and structures adjacent the object.

11. A method in accordance with claim 7 wherein channeling light through the electronic mask opening comprises blocking at least one of ambient light, light reflected from portions of the object outside the object profile, and light reflected from structures adjacent to the object from being received by the imaging sensor.

12. A method in accordance with claim 7 wherein generating an electronic mask comprises:
   generating an electronic fringe mask that includes an electronic fringe opening having a profile defined to substantially match a first profile of the object as viewed from the light source; and
   generating an electronic image mask that includes an electronic image opening having a profile defined to substantially match a second profile of the object as viewed from the imaging sensor, wherein the second profile of the object is smaller than and at least partially contained within the first profile of the object.

13. A method in accordance with claim 12 wherein channeling light through the electronic mask opening comprises:
- illuminating the object by channeling light emitted from the light source through the electronic fringe mask opening; and
- receiving light into the imaging sensor through the electronic image mask opening.

14. A structured light measurement system for inspecting an object, said structured light measurement system comprising:
- a structured light source configured to project structured light onto a surface of the object;
- an imaging sensor configured to receive structured light reflected from the object surface; and
- an electronic mask operable with one of said structured light source and said imaging sensor, said electronic mask including an electronic opening having a profile defined to substantially match a profile of the object to be inspected as viewed from one of said light source and said imaging sensor.

15. A system in accordance with claim 14 wherein said electronic mask is operable with said light source to channel light emitted by said light source through said electronic mask opening such that light is dispersed in an illumination pattern that substantially matches the object profile.

16. A system in accordance with claim 14 wherein said electronic mask is operable with said imaging sensor to channel light reflected from the object through said electronic mask opening such that light is dispersed therefrom in a pattern that substantially matches the object profile.

17. A system in accordance with claim 14 wherein said structured light source comprises at least one of a laser, a white light lamp, a light emitting diode (LED), a liquid crystal display (LCD) device, a liquid crystal on silicon (LCOS) device, and a digital micromirror device (DMD).

18. A system in accordance with claim 14 wherein said electronic mask is configured to block light emitted from said light source from illuminating at least one of a portion of the object outside the object profile and structures adjacent to the object.

19. A system in accordance with claim 14 wherein said electronic mask is configured to substantially block at least one of ambient light, light reflected from surfaces of the object outside the object profile, and light reflected from structures adjacent to the object from being received by said imaging sensor.

20. A system in accordance with claim 14 wherein said electronic mask is an electronic fringe mask operable with said light source and having an electronic fringe opening having a profile defined to substantially match a first profile of the object as viewed from the light source, and said system further comprises an electronic image mask operable with said imaging sensor and having an electronic image mask having an electronic image opening having a profile defined to substantially match a second profile of the object as viewed from the imaging sensor, wherein the second profile of the object is smaller than and at least partially contained within the first profile of the object.

* * * * *